United States Patent [19]

Aizawa

[11] Patent Number: 5,545,963
[45] Date of Patent: Aug. 13, 1996

[54] SEEK METHOD AND APPARATUS

[75] Inventor: Nobuhiro Aizawa, Chichibu, Japan

[73] Assignee: Canon Denshi Kabushiki Kaisha, Chichibu, Japan

[21] Appl. No.: 220,485

[22] Filed: Mar. 31, 1994

[30]     Foreign Application Priority Data

Apr. 1, 1993  [JP]  Japan ................................. 5-098505
Apr. 2, 1993  [JP]  Japan ................................. 5-100300

[51] Int. Cl.⁶ .................................................. H02P 8/00
[52] U.S. Cl. ........................ 318/696; 318/685; 318/138; 318/439; 318/254; 360/78.13
[58] Field of Search .................................. 318/685, 696, 318/138, 439, 254; 360/78.13

[56]             References Cited

U.S. PATENT DOCUMENTS

| | | | |
|---|---|---|---|
| 4,540,927 | 9/1985 | Tanimoto | 318/696 |
| 4,567,418 | 1/1986 | Takemoto et al. | 318/685 |
| 4,812,727 | 3/1989 | Sakai et al. | 318/696 |
| 4,857,817 | 8/1989 | Kugioka | 318/696 |
| 5,084,661 | 1/1992 | Tanaka | 318/685 |
| 5,157,515 | 10/1992 | Hasegawa | 318/696 |
| 5,175,482 | 12/1992 | DeGuchi | 318/696 |

Primary Examiner—William M. Shoop, Jr.
Assistant Examiner—Karen Masih
Attorney, Agent, or Firm—Spencer & Frank

[57]            ABSTRACT

A seek method and an apparatus using a stepping motor, which can eliminate disadvantages of the two-phase excitation (large seek noise and great power consumption) while maintaining advantages of the two-phase excitation (large torque and high stop accuracy). A stepping motor is driven by two-phase exciting signals, each of which includes a short term one-phase excitation state whose duration is shorter than a pulse interval of a step pulse train. The one-phase excitation state is inserted between two consecutive two-phase excitation states. A two-phase exciting signal associated with a start or a change in seek direction may exclude the one-phase excitation state so that the stepping motor can produce large torque.

18 Claims, 6 Drawing Sheets

SEEK METHOD AND APPARATUS

BACKGROUND OF THE INVENTION

1. Field of the Invention

The present invention relates to a seek method and an apparatus using a stepping motor, which controls a seek operation of a head carriage or the like using a stepping motor.

2. Description of Related Art

Figure 1:
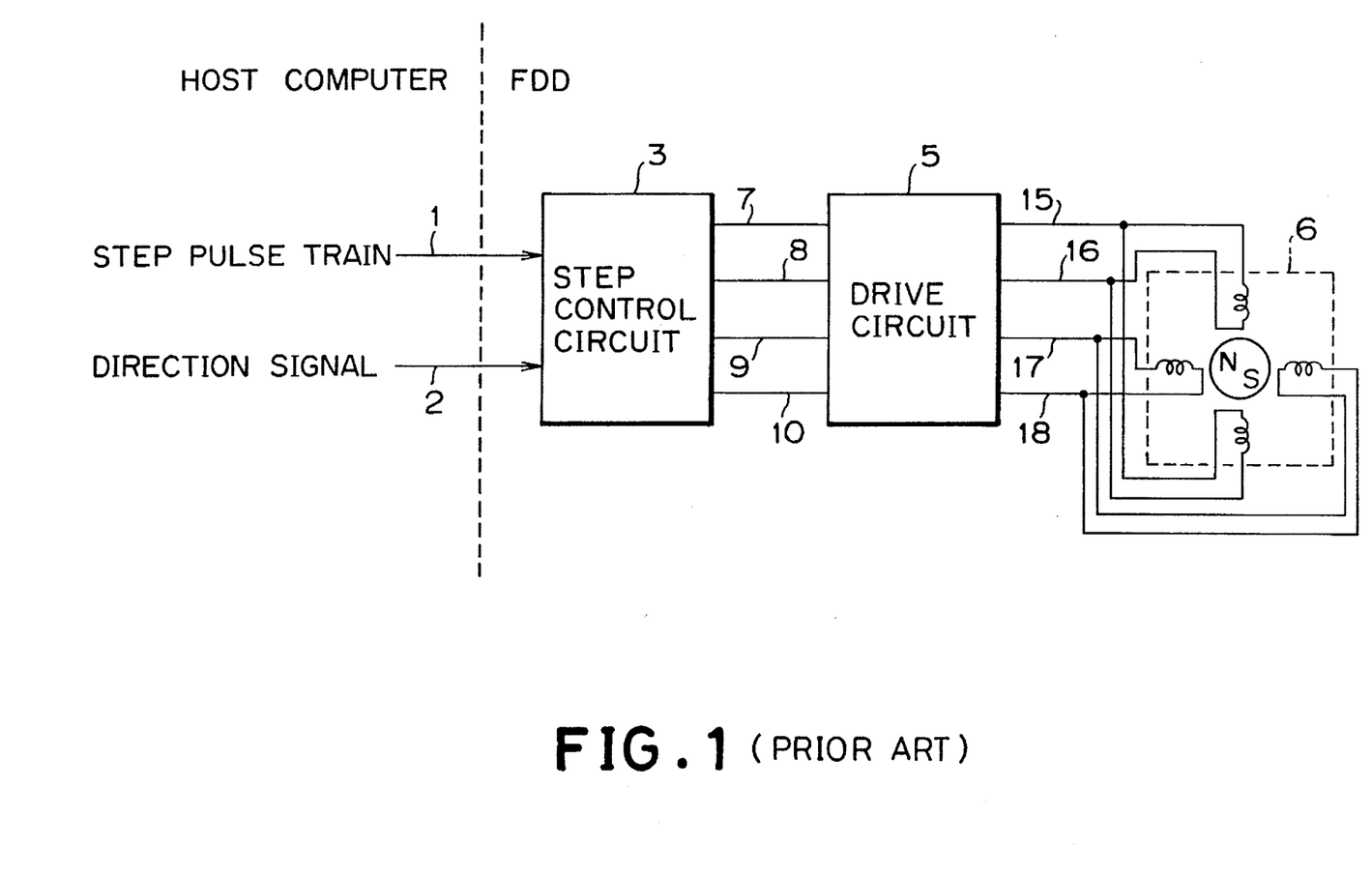
FIG. 1 is a block diagram showing a conventional two-phase excitation circuit of a stepping motor.
Figure 2:
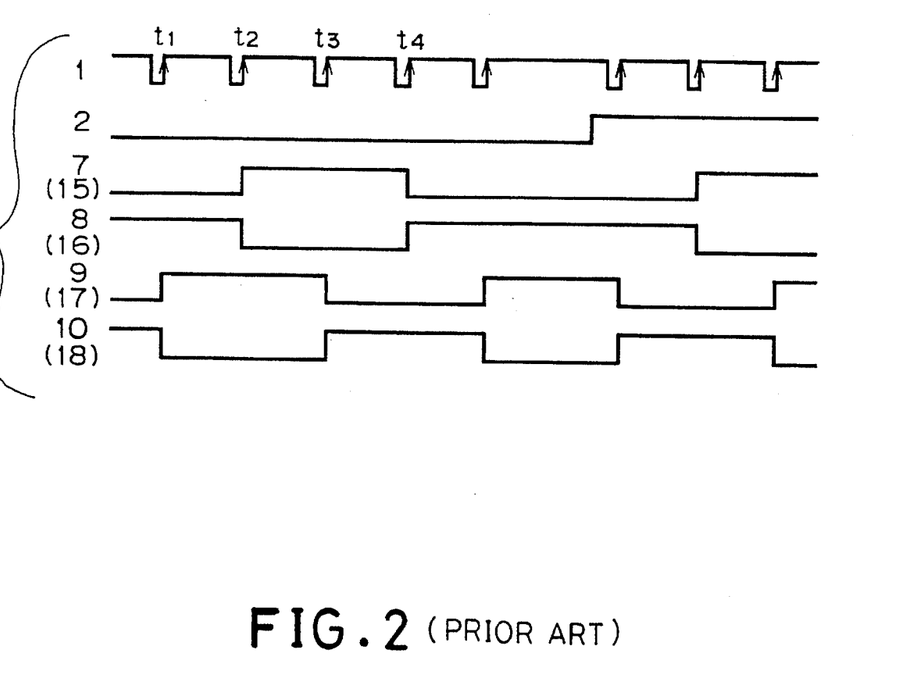
FIG. 2 is a timing chart illustrating major signals in the circuit of FIG. 1.

Typical conventional seek methods using a stepping motor include the one-phase excitation, two-phase excitation, and alternation of the one-phase excitation with two-phase excitation. Since the present invention is directed to an improvement in the two-phase excitation, the conventional two phase excitation will be explained with reference to FIGS. 1 and 2 to help understanding of the present invention. FIG. 1 is a block diagram showing a conventional two-phase excitation circuit, and FIG. 2 is a flowchart of major signals of the circuit of FIG. 1. This configuration is widely used in an FDD (Floppy Disk Drive).

In FIGS. 1 and 2, the reference numeral 1 designates a step pulse train transferred from a host system, and 2 designates a direction signal also transferred from the host system. The step pulse train 1 and the direction signal 2 are both inputted to a step-control circuit 3, which generates two-phase exciting signals 7–10 on the basis of the two input signals 1 and 2. The two-phase exciting signals 7–10 are supplied to a drive circuit 5, which produces drive signals 15–18 in response to the two-phase exciting signals 7–10. The drive signals 15–18 correspond to the two-phase exciting signals 7–10, respectively, and are supplied to a stepping motor 6.

The conventional excitation methods, however, have the following drawbacks:

(1) Drawbacks of the one-phase excitation are small torque producing ability, oscillation involved in stepping, and rough positioning accuracy.

(2) Drawbacks of the two-phase excitation are loud seek noise, and large current consumption. (Its advantages are large torque producing ability, and high positioning accuracy).

(3) Drawbacks of the alternation of the two-phase excitation with one-phase excitation are those of the two-phase excitation and the one-phase excitation, which occur alternately for each step.

SUMMARY OF THE INVENTION

It is therefore an object of the present invention to provide a seek method and an apparatus using a stepping motor, which can eliminate the drawbacks of the two-phase excitation with maintaining the advantages thereof.

In a first aspect of the present invention, there is provided a seek method using a stepping motor driven in response to a step pulse train consisting of a plurality of step pulses, the seek method comprising the steps of:

generating a first two-phase excitation state in response to a first step pulse of the step pulse train;

generating a one-phase excitation state following the first two-phase excitation state in response to a second step pulse of the pulse train; and generating a second two-phase excitation state following the one-phase excitation state, the duration of the one-phase excitation state plus that of the second two-phase excitation state being substantially equal to the period of the pulse train.

Here, the steps of generating the one-phase excitation state and generating the second two-phase excitation state may be repeated in response to individual step pulses following the second step pulse.

The duration of the first two-phase excitation state may be substantially equal to the period of the pulse train.

The first two-phase excitation state, and the second two-phase excitation state may be generated on the basis of a plurality of exciting signals formed in response to the step pulse train, and the one-phase excitation state may be generated by delaying the rising edge or falling edge of at least one of the exciting signals by a predetermined time.

The first two-phase excitation state may be generated in a predetermined condition where the stepping motor necessitates a large torque-producing ability.

The predetermined condition may be a start or a seek direction change of the stepping motor.

The start and the seek direction change of the stepping motor may be detected by measuring the time interval between two consecutive step pulses of the step pulse train.

The duration of the one-phase excitation state may be changed in accordance with the step rate of the stepping motor.

The step rate of the stepping motor may be determined by measuring the period of the step pulse train.

In a second aspect of the present invention, there is provided a seek apparatus using a stepping motor driven in response to a step pulse train and a direction signal, the seek apparatus comprising:

a first step control circuit generating a series of first two-phase exciting signals in response to the step pulse train;

a second step control circuit generating a series of second two-phase exciting signals in response to the first two-phase exciting signals supplied from the first step control circuit, each of the second two-phase exciting signals including a one-phase exciting signal, the duration of the one-phase exciting signal being shorter than the period of the step pulse train; and a drive circuit for driving the stepping motor in response to the second two-phase exciting signals supplied from the second step control circuit.

Here, the second step control circuit may generate the one-phase exciting signal by delaying the rising edge or falling edge of at least one of the first two-phase exciting signals by a predetermined time.

The second step control circuit may generate the second two-phase exciting signal without including the one-phase exciting signal in a predetermined condition where the stepping motor necessitates a large torque-producing ability.

The second step control circuit may comprise means for detecting the predetermined condition on the basis of the step pulse train or the direction signal.

The second step control circuit may comprise means for detecting the step rate of the stepping motor on the basis of the step pulse train, and means for controlling the duration of the one-phase excitation state in accordance with the step rate of the stepping motor.

The predetermined condition may be a start or a seek direction change of the stepping motor.

The means for detecting the predetermined condition may comprise means for detecting an interval between two consecutive step pulses of the step pulse train, and deciding a start of the stepping motor when the interval is longer than a predetermined reference value.

The means for detecting the predetermined condition may comprise means for detecting a change in polarity of the direction signal, and deciding a change of the seek direction of the stepping motor when the change in polarity is detected.

The means for detecting the step rate may detect the step rate of the stepping motor on the basis of the period of the step pulse train.

According to one aspect of the present invention, a seek operation of smoother movement and lesser noise can be achieved than in the conventional two-phase excitation method, because a short duration one-phase excitation state is inserted between two consecutive two-phase excitation states. In addition, since the excitation method in accordance with the present invention is basically a two-phase excitation and the stop state of the stepping motor is always associated with the two-phase excitation, the stop accuracy is high, equivalent to that of the normal two-phase excitation. Furthermore, power consumption of the stepping motor is reduced because the one-phase excitation state is inserted. Moreover, the present invention can be easily implemented based on the conventional two-phase excitation method.

According to another aspect of the present invention, start torque of the stepping motor can be maintained at a value equivalent to that of the normal two-phase excitation because the normal two-phase excitation takes place at a start or a change in direction of the stepping motor. In addition, duration of the one-phase excitation state can be automatically set at an appropriate value because it is determined in accordance with the interval between the preceding two consecutive step pulses, which corresponds to the step rate. For example, the one-phase excitation duration is set at a large value when the interval is long, whereas it is set at a small value when the interval is short. Determining the one-phase excitation duration in accordance with the step rate makes it possible to reduce power consumption and seek noise with the follow-up ability maintained.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The present invention will now be described with reference to the accompanying drawings.
EMBODIMENT 1

Figure 3:
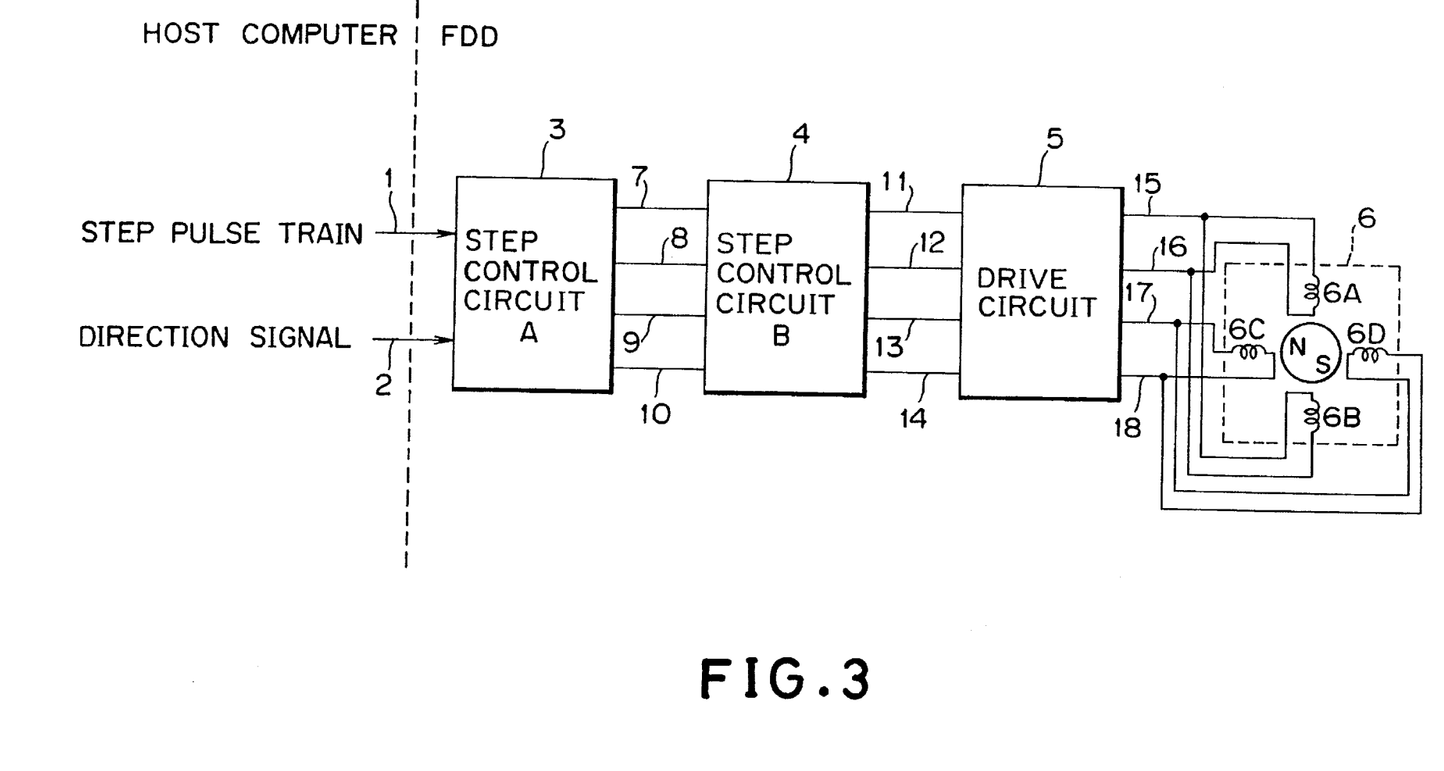
FIG. 3 is a block diagram showing a first embodiment of a stepping motor control circuit in accordance with the present invention, which is applied to a floppy disk drive.
Figure 4:
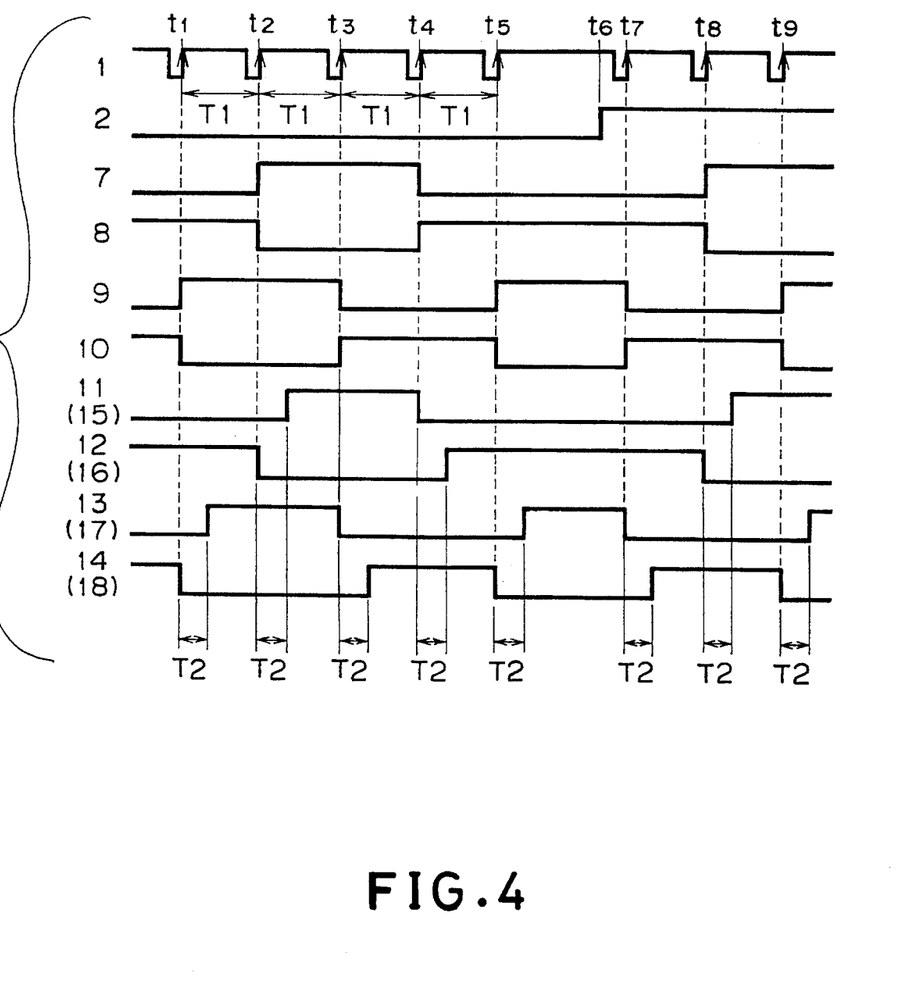
FIG. 4 is a timing chart illustrating major signals in the circuit of FIG. 3.

FIG. 3 is a block diagram showing a first embodiment of the seek method and an apparatus using a stepping motor in accordance with the present invention, and FIG. 4 is a timing chart of major signals thereof.

In FIGS. 3 and 4, the reference numeral 1 designates the step pulse train transferred from a host system, and 2 designates the direction signal also transferred from the host system. The step pulse train 1 and the direction signal 2 are both inputted to a step-control circuit A 3, which generates two-phase exciting signals 7–10 on the basis of the two input signals 1 and 2. The two-phase exciting signals 7–10 are supplied to a step-control circuit B 4, which generates two-phase exciting signals 11–14 from the two-phase exciting signals 7–10. The two-phase exiting signals 11–14 are supplied to a drive circuit 5, which produces drive signals 15–18 in response to the two-phase exciting signals 11–14. The drive signals 15–18 correspond to the two-phase exciting signals 11–14, respectively, and are supplied to the stepping motor 6.

The first embodiment differs from the conventional system in FIG. 1 in that it includes the step control circuit B 4 in addition to the step control circuit A 3 identical to the step control circuit 3 of FIG. 1.

As clearly shown in FIG. 4, the rising edges of the two-phase exciting signals 11–14 (and those of the corresponding drive signals 15–18) are delayed by a time period T2 from those of the normal two-phase exciting signals 7–10. As a result, no current flows through one of the two pairs of opposite windings during the time period T2, thereby making one-phase excitation state. For example, during the time period T2 following time t1, although a current flows through the opposite windings 6A and 6B, no current flows through the opposite windings 6C and 6D. The time period T2 is determined at an amount smaller than the period T1 of the step pulse train 1.

The operation of the system for driving the stepping motor will now be described. The step control circuit A 3 generates the two-phase exciting signals 7–10 based on the present excitation state and the direction signal 2 in response to the step pulse train 1 supplied from the host computer. In the conventional system as shown in FIG. 1, the two-phase exciting signals 7–10 are directly supplied to the drive circuit 5, which generates the drive signals 15–18, and provides them to the stepping motor. In contrast with this, in the present invention, the two-phase exciting signals 7–10 are supplied to the step control circuit B 4, which converts them to the modified two-phase exciting signals 11–14, and supplies them to the drive circuit 5.

As described above, the modified two-phase exciting signals 11–14 are formed by delaying the rising edges of the respective two-phase exciting signals 7–10 by the time period T2, and this produces the one-phase excitation state for T2. The modified two-phase exciting signals 11–14 are inputted to the drive circuit 5, which produces the drive signals 15–18 corresponding to the modified two-phase exciting signals 11–14. Thus, the stepping motor 6 is provided with the drive signals 15–18.

Although the short-term one-phase excitation states are produced by delaying the rising edges of the two-phase exciting signals 7–10 by the time period T2, they may be produced by delaying the falling edges of the signals 7–10 by the time period T2.
EMBODIMENT 2

In the first embodiment, a short-term one-phase excitation state is inserted between two consecutive two-phase excitation states. This operation mode will be referred to as "a two-phase excitation with one-phase excitation inserted mode" in this specification.

A stepping motor having an insufficient torque-producing margin, however, might present a problem in the two-phase excitation with one-phase excitation inserted mode in that its torque-producing ability may be not enough, and hence high traceability might not be achieved under such conditions as a very large torque is required as at a starting or changing direction of the stepping motor. In addition, in a machine like a floppy-disk drive where the stepping rate of the stepping motor must be changed, an appropriate delay time T2 cannot be decided uniquely. This makes it difficult to obtain expected reduction in seek noise. The second embodiment is implemented in view of such conditions.

Figure 5:
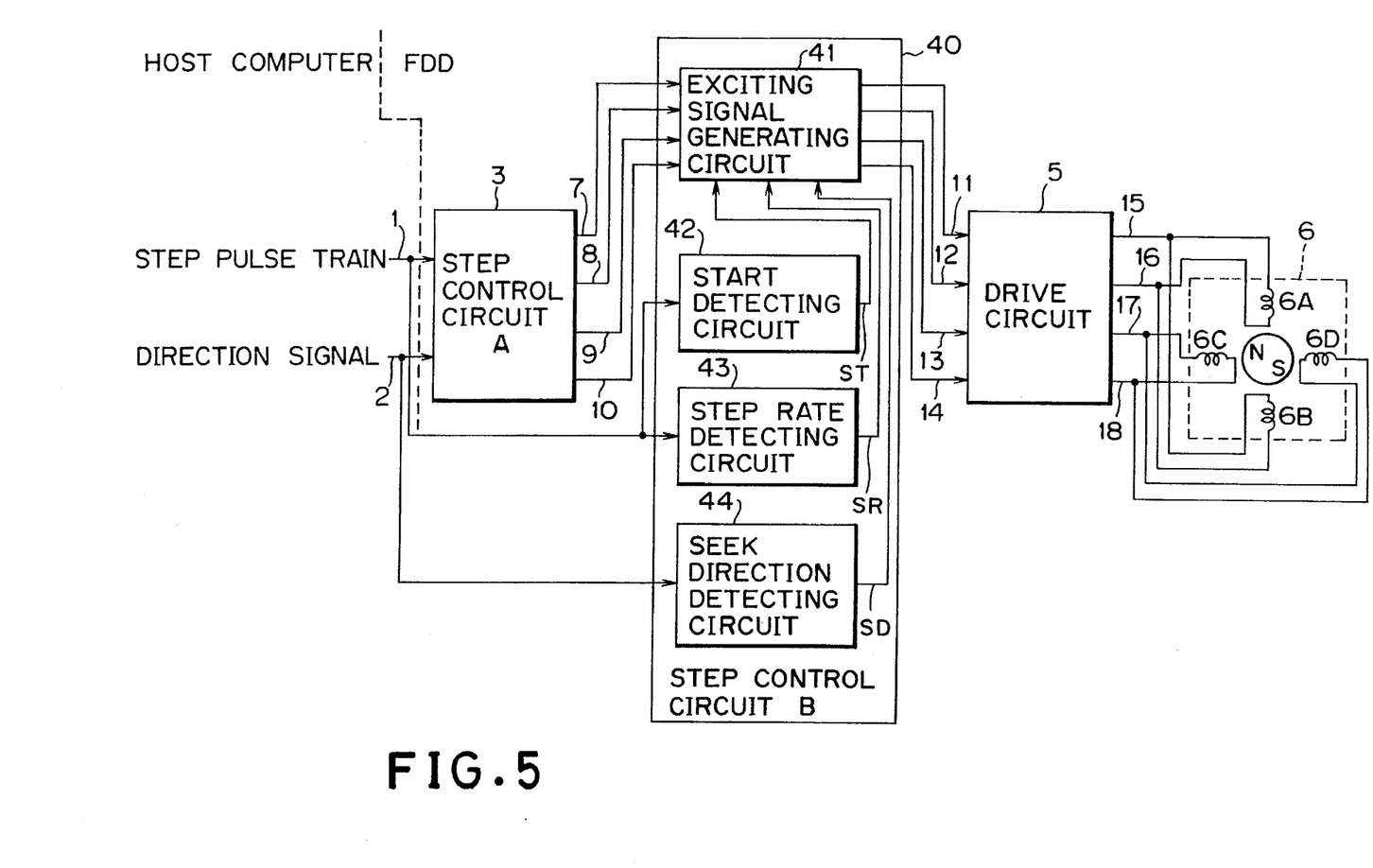
FIG. 5 is a block diagram showing a second embodiment of a stepping motor control circuit in accordance with the present invention, which is applied to a floppy disk drive.
Figure 6:
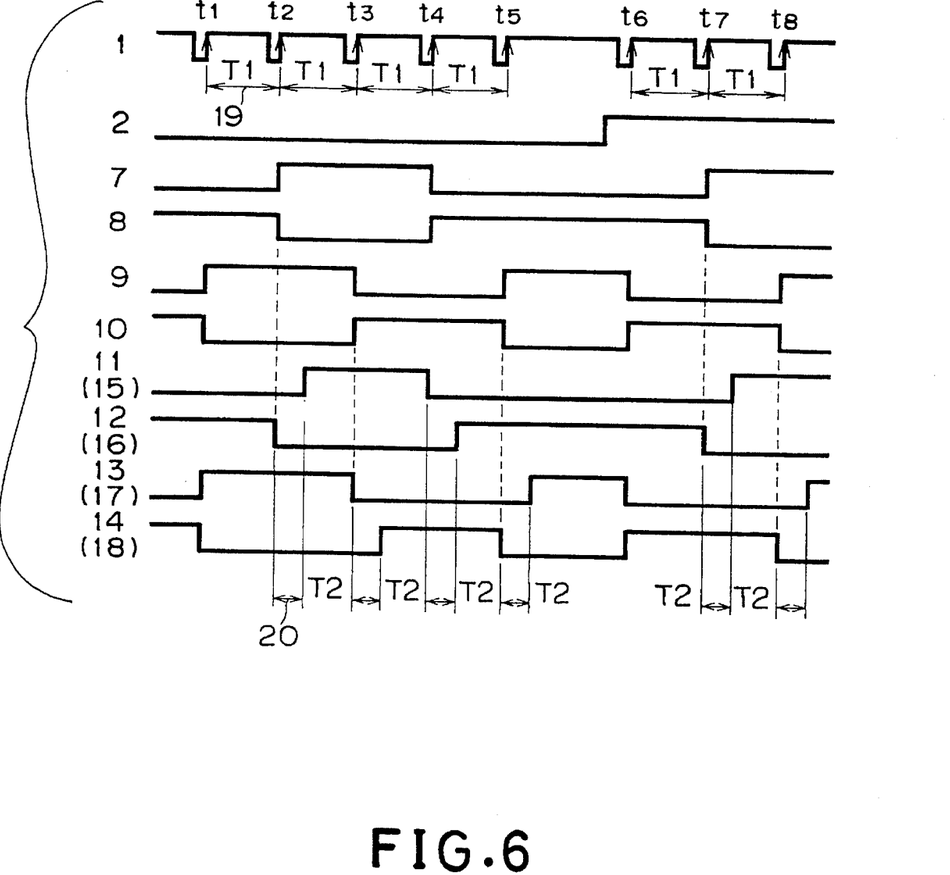
FIG. 6 is a timing chart illustrating major signals in the circuit of FIG. 5.

FIG. 5 is a block diagram showing the second embodiment in accordance with the present invention, which is applied to a floppy disk drive, and FIG. 6 is a timing chart illustrating waveforms of major signals of the system.

The second embodiment differs from the first embodiment in the arrangement of the step control circuit B. The step control circuit B 40 of this embodiment comprises an exciting signal generating circuit 41, a start detecting circuit 42, a step rate detecting circuit 43, and a seek direction switching detecting circuit 44.

The start detecting circuit 42 detects a start timing (t1 of FIG. 6, for example) of the stepping motor by counting the duration from the preceding step pulse to the current step pulse, and by comparing that duration with a reference value, and outputs a start signal ST. The step rate detecting circuit 43 detects the step rate by measuring the time duration between successive step pulses, and outputs a step rate signal SR. The seek direction switching detecting circuit 44 detects the seek direction switching (occurring between t5 and t6 of FIG. 6, for example) by detecting a rising edge or a falling edge of the direction signal, and outputs a seek direction switching signal SD. The exciting signal generating circuit 41 generates the exciting signals 11–14 as illustrated in FIG. 6.

The operation of the embodiment for driving the stepping motor will be described with reference to FIG. 6. The control circuit A 3, receiving the step pulse train 1 from the host computer, generates the exciting signals 7–10 depending on the present state of excitation and the direction signal 2. The exciting signals 7–10 are supplied to the exciting signal generating circuit 41. The exciting signal generating circuit 41 produces the exciting signals 11–14 in response to the exciting signals 7–10, the start signal ST, the step rate signal SR, and the seek direction switching signal SD.

If a step pulse of the step pulse train 1 occurs at a start point or immediately after the direction switching, the exciting signal generating circuit 41 produces normal two-phase exciting signals 11–14 as at times t1 and t6 of FIG. 6. Otherwise, the exciting signal generating circuit 41 produces two-phase exciting signals 11–14 with one-phase excitation inserted as at times t2–t5, and t7 and t8 of FIG. 6. The time period T2 is determined in accordance with the interval T1 between the two preceding pulses.

The two-phase exciting signals 11–14 with one-phase excitation inserted are delayed by time period T2 at their rising edges as illustrated in FIG. 6. As a result, no excitation current will flow through one of the two pairs of opposite windings (windings 6A and 6B, for example) during the time period T2, resulting in the one-phase excitation. The exciting signals 11–14 are fed to the drive circuit 5, which supplies the stepping motor 6 with the drive signals 15–18.

VARIATION 1

The foregoing first and second embodiments are directed to a floppy disk drive, in which its heads are moved one track per one step pulse of the stepping motor. Some present floppy disk drives, however, moves its heads one track per two drive pulses by adding one more pulse after a fixed time has elapsed from the preceding step pulse transferred from the host computer. This step pulse adding method is referred to as a "fixed intermediate step pulse additional method". This method can also be achieved by a system similar to those of FIGS. 3 and 5, which handles the additional pulses generated in the system in a manner analogous to that of handling the step pulses sent from the host computer in the systems of FIGS. 3 and 5.

VARIATION 2

The one track per two steps movement of the heads in a floppy disk drive can also be achieved by another method. This method measures the time duration between two consecutive step pulses when receiving the step pulse train 1 from the host computer, and adds an additional step pulse at the middle of the two consecutive step pulses. This step pulse additional method is referred to as an "automatic middle step pulse additional method". In this method, step pulses to be added to several initial step pulses from a start are generated at a fixed time later than those step pulses. The present invention can also be applied to such a case.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A seek method using a stepping motor driven in response to a step pulse train consisting of a plurality of step pulses, said seek method comprising the steps of:

generating a first two-phase excitation state in response to a first step pulse of the step pulse train;

generating a one-phase excitation state following the first two-phase excitation state in response to a second step pulse of the pulse train; and generating a second two-phase excitation state following the one-phase excitation state until a third step pulse of the pulse train is produced, the duration of the one-phase excitation state plus that of the second two-phase excitation state being substantially equal to one period of the pulse train.

2. The seek method using a stepping motor as claimed in claim 1, wherein the step of generating the one-phase excitation state and the step of generating the second two-phase excitation state are repeated in response to individual step pulses following the second step pulse.

3. The seek method using a stepping motor as claimed in claim 2, wherein the duration of the first two-phase excitation state is substantially equal to one period of the pulse train.

4. The seek method using a stepping motor as claimed in claim 1, wherein the first two-phase excitation state, and the second two-phase excitation state are generated on the basis of a plurality of exciting signals formed in response to the step pulse train, and the one-phase excitation state is generated by delaying an edge of at least one of the exciting signals by a predetermined time, wherein the edge which is delayed is chosen from the group consisting of: a rising edge and a falling edge.

5. The seek method using a stepping motor as claimed in claim 3, further comprising detecting a predetermined condition of the stepping motor, wherein the step of generating the first two-phase excitation state is executed upon detection of the predetermined condition of the stepping motor, the predetermined condition being a condition where it is known that the stepping motor is required to produce a large torque.

6. The seek method using a stepping motor as claimed in claim 5, wherein the predetermined condition is chosen from the group consisting of: a start of the stepping motor and a seek direction change of the stepping motor.

7. The seek method using a stepping motor as claimed in claim 6, wherein the start of the stepping motor and the seek direction change of the stepping motor are detected by measuring the time interval between two consecutive step pulses of the step pulse train.

8. The seek method using a stepping motor as claimed in claim 5, wherein the stepping motor has a step rate, the method further comprising determining the step rate of the stepping motor and changing the duration of the one-phase excitation state in accordance with the step rate of the stepping motor.

9. The seek method using a stepping motor as claimed in claim 8, wherein the step of determining the step rate of the stepping motor comprises measuring the period of the step pulse train.

10. A seek apparatus using a stepping motor driven in response to a step pulse train and a direction signal, said seek apparatus comprising:
   a first step control circuit generating a series of first two-phase exciting signals in response to the step pulse train;
   a second step control circuit generating a series of second two-phase exciting signals in response to the first two-phase exciting signals supplied from the first step control circuit, the second step control circuit generating the second two-phase exciting signals to include a one-phase exciting signal, the duration of the one-phase exciting signal being shorter than one period of the step pulse train; and
   a drive circuit for driving the stepping motor in response to the second two-phase exciting signals supplied from the second step control circuit.

11. The seek apparatus using a stepping motor as claimed in claim 10, wherein the second step control circuit generates the one-phase exciting signal with means for delaying an edge of at least one of the second two-phase exciting signals by a predetermined time, wherein the edge which is delayed is chosen from the group consisting of a rising edge and a falling edge.

12. The seek apparatus using a stepping motor as claimed in claim 10, wherein the second step control circuit generates, in response to the first two-phase exciting signals supplied from the first step control circuit, a second two-phase exciting signal which does not include a one-phase exciting signal in a predetermined condition where the stepping motor is required to produce a large torque.

13. The seek apparatus using a stepping motor as claimed in claim 12, wherein the second step control circuit comprises a start detection circuit and a seek direction switching detection circuit, for detecting the predetermined condition based on the step pulse train and the direction signal, respectively.

14. The seek apparatus using a stepping motor as claimed in claim 12, wherein the second step control circuit comprises means for detecting the step rate of the stepping motor on the basis of the step pulse train, wherein the means for detecting the step rate determines the duration of the one-phase excitation state.

15. The seek apparatus using a stepping motor as claimed in claim 12, wherein the predetermined condition is chosen from the group consisting of: a start of the stepping motor and a seek direction change of the stepping motor.

16. The seek apparatus using a stepping motor as claimed in claim 13, wherein said start detection circuit detects a start of the stepping motor by counting a duration from a preceding step pulse to a next step pulse, and comparing the duration with a predetermined reference value, and outputs a start signal.

17. The seek apparatus using a stepping motor as claimed in claim 13, wherein said seek direction switching detection circuit detects a seek switching from a rising edge and a falling edge of the direction signal, and outputs a seek direction switching signal.

18. The seek apparatus using a stepping motor as claimed in claim 12, wherein said means for detecting the step rate detects the step rate of the stepping motor on the basis of the period of the step pulse train.

* * * * *